United States Patent [19]

Kerlek et al.

[11] Patent Number: 5,763,070
[45] Date of Patent: Jun. 9, 1998

[54] ARTICLE HAVING MOISTURE-RESISTANT SAFETY SURFACE AND METHOD OF PREPARATION

[75] Inventors: Jerome G. Kerlek; Mervyn R. Litzow, both of Chagrin Falls, Ohio

[73] Assignee: Safeguard Technology, Inc., Chagrin Falls, Ohio

[21] Appl. No.: 588,338

[22] Filed: Jan. 18, 1996

[51] Int. Cl.$^6$ .............................. B32B 19/02; E04F 11/16
[52] U.S. Cl. ................ 428/329; 428/331; 428/469; 428/472.2; 156/330; 427/302; 427/327; 427/386
[58] Field of Search ................... 428/329, 331, 428/457, 469, 472.2, 147, 908.8; 427/302, 327, 386; 156/281, 330

[56] References Cited

U.S. PATENT DOCUMENTS

| | | | |
|---|---|---|---|
| 3,575,780 | 4/1971 | Trieschmann et al. | 161/123 |
| 3,639,135 | 2/1972 | Hohman et al. | 428/335 X |
| 3,745,034 | 7/1973 | Smith et al. | 117/17 |
| 4,029,852 | 6/1977 | Palena | 428/621 |
| 4,243,696 | 1/1981 | Toth | 427/27 |
| 4,396,650 | 8/1983 | Lange et al. | 427/409 |
| 4,448,847 | 5/1984 | Bell et al. | 428/413 |
| 4,528,231 | 7/1985 | Lund | 428/148 |
| 4,812,363 | 3/1989 | Bell et al. | 428/420 |
| 4,998,391 | 3/1991 | Connew | 52/179 |
| 5,077,137 | 12/1991 | Molnar | 428/601 |
| 5,093,203 | 3/1992 | Mowrey et al. | 428/517 X |
| 5,256,170 | 10/1993 | Harmer et al. | 51/293 |
| 5,475,951 | 12/1995 | Litzow | 52/177 |

OTHER PUBLICATIONS

Adhesives and Sealants. Engineered Materials Handbook. vol. 3. Published 1990 by ASM International.
Surface Considerations, Clearfield, McNamar and Davis, pp. 270–273.
Moisture Effects on Adhesive Joints, Nak–Ho Sung, pp. 623–627.

*Primary Examiner*—Daniel Zirker
*Attorney, Agent, or Firm*—James A. Lucas; Driggs & Vynalek

[57] ABSTRACT

A shaped or flat article, having a skid resistant surface is adapted for use on floors, stairs, ladder rungs, and ramps particularly in moist and wet locations where a highly durable surface is required. The article is prepared by cleaning a surface of a ferrometallic base followed by application of a polychloroprene primer layer to the surface from an organic solvent. This is then followed by adhering and covering the primed base, in the area where the skid resistant surface is required, with a thermosetting epoxy resin. Partially embedded in the resin are particles of a grit material. One or more additional layers of a suitable coating such as paint may be applied on top of the cured resin for visibility, luminescence, cleanability, and added protection.

14 Claims, 2 Drawing Sheets

ARTICLE HAVING MOISTURE-RESISTANT SAFETY SURFACE AND METHOD OF PREPARATION

BACKGROUND OF THE INVENTION

1. Technical Field

This invention relates to articles having skid resistant surfaces, particularly surfaces having exposed embedded elements such as particles of grit securely bonded by an epoxy resin to a metallic substrate and to the method of preparing such articles. The articles are particularly useful in wet environments, where they are highly resistant to delamination.

2. Description of Related Art

This invention is directed to a new article of manufacture which can be used in a variety of applications to provide enhanced safety to persons walking, climbing, working or otherwise moving around on surfaces that may have a tendency to become slippery through repeated use, through spillage, or because the surfaces are wet or in a damp environment. Catwalks, landings, walkways, workstations, ramps, ladders, entryways to buses and trains, and stairs are just some of the places where the article prepared by this invention can be used. In addition it can be used in locations where operating equipment such as lifts, cranes, and towmotors move across such surfaces that tend to become wet and slippery during use.

A variety of methods have traditionally been used to produce articles with skid resistant surfaces. The production of such surfaces using electric arc or gas flame spraying are shown in a number of references such as U.S. Pat. No. 4,029,852 and U.S. Pat. No. 5,077,137. The deposition of a metallic powder on a metal strip by electrostatic techniques using a gaseous aerosol is described in U.S. Pat. No. 3,745,034. The use of ground rubber or cork, bonded by polyvinyl chloride, acrylic resins or polyisobutylene is shown and described in U.S. Pat. 3,575,780. U.S. Pat. No. 4,243,696 describes a method for cascading a mixture of powdered resin and particulate material onto the surface of an article followed by heating to soften the resin and adhere the particles to the surface. U.S. Pat. No. 5,256,170 describes a coated abrasive article such as a sanding belt comprising a monolayer of grit particles adhered to a flexible backing using a make-coat layer and a size coat layer, either of which may contain epoxy resins. U.S. Pat. No. 5,475,951 describes a skid resistant surface made by using an epoxy resin to bond a flexible mesh layer and abrasive grit particles to an etched and cleaned ferrometallic substrate.

Each of these processes or the resultant products have certain deficiencies. For example, the coated surface may not have adequate abrasion resistance, whereupon the surface is quickly abraded and the skid resistant characteristics are lost; the substrate and/or layers may be so thick as to present a trip hazard when the product is mounted on stair treads, walkways, etc.; procedures such as grit blasting and/or etching of the substrate surface may be needed to prepare the surface for adequate bonding of the abrasive; the surface may lack the ability to resist degradation when used in applications where it may be subjected to chemical spills, environments where corrosive or other damaging vapors are present, or where the surface frequently is wet.

SUMMARY OF THE INVENTION

One object of the present invention is to overcome the myriad of deficiencies and drawbacks inherent in the procedures for preparing prior art skid resistant surfaces, as well as drawbacks in the surfaces per se.

Another object is to provide articles that have highly skid resistant surfaces, for use on existing stairways, ladder rungs, walkways, platforms, gratings and other structures, said articles having outstanding resistance to moisture—induced delamination.

Another object is to provide a polymeric skid resistant surface on a ferrometallic substrate using a process that does not require etching or blasting of the substrate surface to prepare it for the formation of a moisture—resistant bond with the polymer.

Yet another object is a highly moisture resistant, chemical resistant and wear resistant coated article that can be produced in a variety of shapes, sizes, colors, and particle textures for differing end use applications.

These and other objects, features and advantages will become apparent from a consideration of the following detailed description, taken in conjunction with the accompanying drawings.

In one aspect of the present invention, a skid resistant surface is applied to a ferrometallic substrate by cleaning the surface, applying a primer to the cleaned surface, drying the primer, and bonding an epoxy resin containing particles of grit to the primed surface. The substrate is preferably stainless steel or a surface treated steel such as galvanized steel. The steel typically is plate steel having a thickness between 16 and 24 gauge, preferably about 20 gauge. The cleaned surface is primed by applying a coating of a polychloroprene rubber, deposited, for example, from an organic solution having a viscosity below 450 cps. The organic solvent preferably is a mixture of petroleum distillate, acetone, methyl ethyl ketone and toluene. The primer layer is dried after which a first layer of an uncured epoxy resin is applied over the primed surface to a thickness between about 10 and about 20 mils. This is followed by applying grit particles to the uncured surface and thereafter applying a second layer of an uncured epoxy resin on top of the first layer to a thickness of 20 to 40 mils. The resin is then cured to secure the particles in place and to bond the resin to the primed metal substrate. The particles of grit are silicon carbide, fused aluminum oxide, silica or mixtures thereof having a size of about 16 to 30 grit, preferably about 20 grit.

In another aspect, the invention relates to an article of manufacture prepared by applying a skid resistant surface to a ferrometallic substrate such as stainless steel or galvanized steel. The article is produced by cleaning the substrate, applying an unbroken layer of a primer of polychloroprene rubber to the cleaned surface and drying the primer. The polychloroprene is typically deposited from a solution of an organic solvent, said solution having a viscosity below 450 cps. An uncured epoxy resin containing particles of grit is applied on top of the dried primer to a total resin thickness between about 30 and about 60 mils and the resin is cured. One or more layers of a coating to provide visibility, added wearability or the like may be applied over the cured resin layer. The bond at the interface between the substrate and the cured epoxy resin is unaffected after immersion in water at a temperature of between 130° and 140° F. for a continuous period of time of at least several months, whereas the bond between the epoxy resin and the cleaned substrate without the primer shows signs of delamination and failure in less than 2 weeks of immersion in heated water.

In yet another aspect of the invention, an article of manufacture is described comprising a stainless steel or galvanized steel substrate having a thickness of between about 16 gauge and about 24 gauge and an abrasive layer overlying and bonded to a surface of the substrate. A primer layer of a polychloroprene elastomer is deposited on the substrate surface, typically from a solution of an organic solvent. The abrasive layer comprises a cured layer of an epoxy resin having a thickness of between 30 and about 60 mils containing particles of silicon carbide, fused aluminum oxide, silicon or mixtures thereof in a particle size range of about 16 to 30 grit, preferably about 20 grit. The article is capable of resisting delamination of the epoxy layer from the steel substrate after at least 1000 hours and more typically several thousand hours immersion in water at a sustained elevated temperature between 130° and 140° F.

DETAILED DESCRIPTION OF THE INVENTION

This invention represents a highly moisture resistant article of the type similar to that produced according to the teachings of U.S. Pat. No. 5,475,951, which teachings are incorporated by reference herein.

Figure 1:
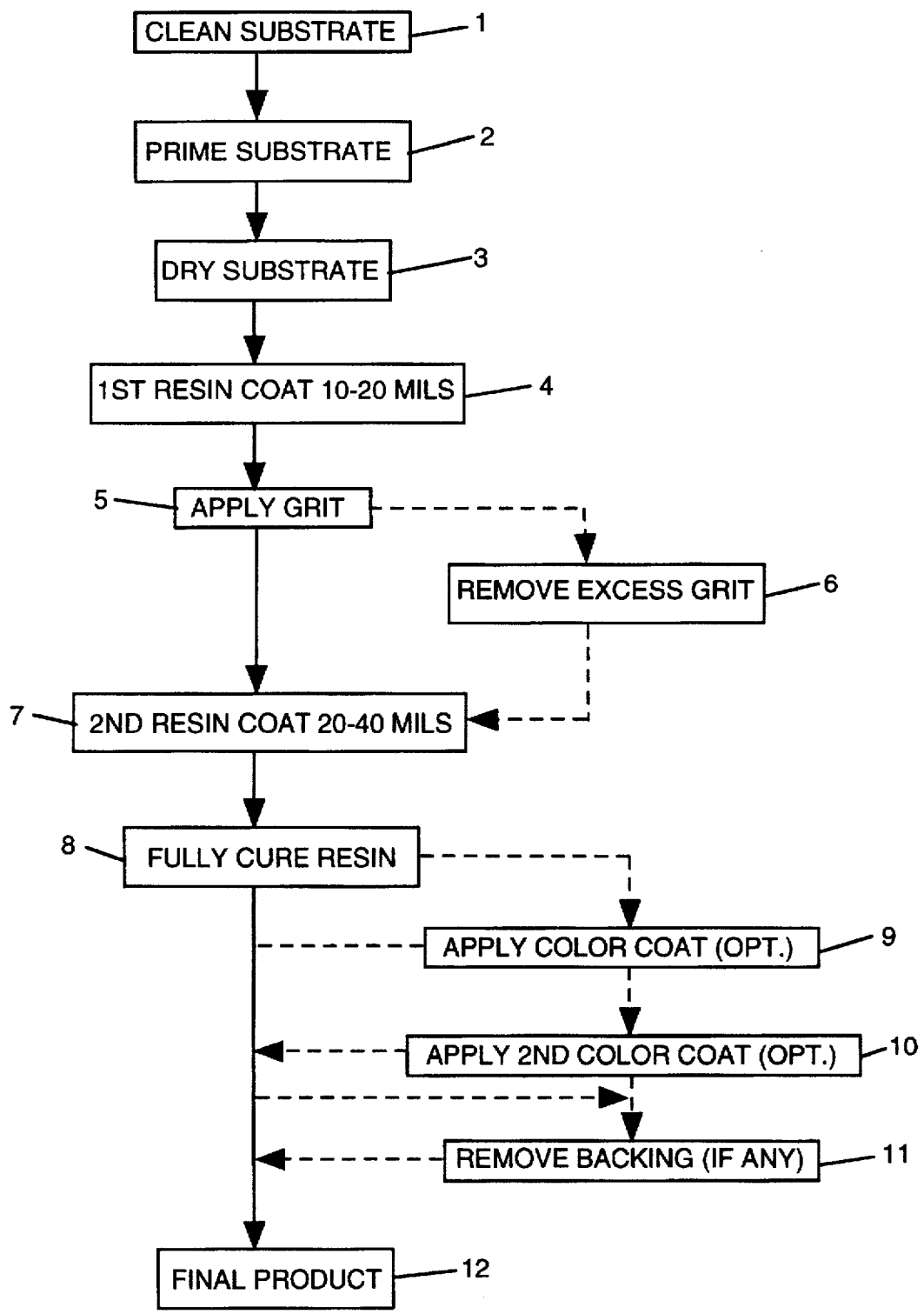
FIG. 1 is a block diagram showing the steps of treating a substrate to give it a skid resistant surface.

Referring now in greater detail to the drawings, FIG. 1 is a flow diagram for the process of treating a metallic substrate to give it a skid resistant surface. The use of a ferrometallic substrate is preferred because of its high strength to thickness ratio and the ability to obtain better adhesion between the thermosetting resin and the ferrous substrate. Stainless steel is a desirable ferrometallic substrate, particularly if the skid resistant surface is going to be used in environmentally hostile applications. The stainless steel is highly resistant to many chemicals, and in addition does not readily oxidize or rust. Type 304 stainless steel having a thickness of about 20 gauge (36–38 mil) is found to be readily suited for the purposes of the present invention. Although thicker substrates may be used, the hazards of tripping or stumbling over the surface become greater as the thickness of the skid resistant surface increases. Accordingly, the thickness is preferably no more than about 20 gauge. If thinner substrates are used, the likelihood of the substrate buckling during processing, handling or installation greatly increases. Other ferrometallic substrates such as galvanized steel are also suitable for use in the teaching of the present invention.

The first step shown in block 1 comprises cleaning of the substrate to remove all traces of dirt, grease, and other deposits from the surface of the metal. The substrate may be cleaned using a detergent or by using high pressure, e.g. 500 psi, water or ultrasound alone or in combination. A preferred detergent for use in the present invention is an alkaline, biodegradable detergent such as Maxum Formula 21077 Degreaser Cleaner sold by Chemsafe International. However, as an alternative to these environmentally safe cleaning techniques, the surface of the substrate can be cleaned using a suitable solvent such as perchloroethylene, trichloroethylene, or acetone. The use of any of these organic solvents requires that steps be taken to minimize evaporation of the solvents, to equip workers with respirators where necessary, and to use appropriate and safe disposal methods for the waste solvents.

In step 2, the surface of the substrate which will eventually become the slip resistant surface is then coated with a primer. Other surfaces which are not intended to be coated may be covered with an adhesive backing if desired either before or after cleaning. The prime coating must coat the complete surface that is to be covered with the epoxy layer to ensure a bond between the resin and the metal which will resist delamination in wet environments. Although the exact phenomenon is unknown, it is believed that moisture is able to diffuse through the epoxy layer until it reaches the interface with the substrate where failure eventually occurs. The application of a thin primer layer of the polychloroprene somehow prevents the moisture from reaching the interface, thereby defeating the mechanism that contributes to premature failure of the bond.

For purposes of the present invention, a polychloroprene dissolved in an organic solvent is satisfactory for the intended purpose. The solution should have a viscosity that is sufficiently low to permit the product to be applied to the substrate by suitable means such as spraying, brushing, rolling, or dipping. The dry weight of the polychloroprene on the substrate preferably is less than 3.5 g/ft. of surface area. A polychloroprene primer found to be suitable in the teaching is Scotch-Grip 1357 sold by 3M. This product is a contact adhesive which, when diluted by the addition of 10% by volume of methyl ethyl ketone (MEK) gives a solution which provides a complete, adherent coating on the surface of the metal. Scotch-Grip 1357 before dilution has a viscosity of 200-450 cps and a solids content between 23 and 27%. The viscosity is measured using a Brookfield Viscometer using an RVF #2Sp. at 20 rpm at 80° F. The product is sold as a solution in a mixture of organic solvents comprising petroleum distillate, acetone, toluene and MEK. Other polychloroprene products sold as a latex emulsion or as a high viscosity (9001700 cps) solution in 1,1,1—trichloroethane were found to give an adequate primer coat as well.

Step 3 involves drying of the polychloroprene on the substrate. Although drying at room temperature under conditions of low (35% R.H. or less) humidity are satisfactory, drying may be carried out at elevated temperatures of, e.g. 180°—220° F.

In step 4 a first layer of the epoxy resin is applied to the clean, primed surface of the substrate. The preferred resin of this invention is one that is produced by the cationic polymerization of a monomeric material containing an oxirane or epoxy ring. These monomers are referred to as 1,2—1,3—, and 1,4 epoxides. The epoxides generally comprise mixtures containing one, two or more epoxy groups per molecule and have molecular weights typically ranging from about sixty to several thousand. Their polymerization is initiated by an acidic or basic promotor such as an amine catalyst. The thickness of the first resin layer is between about 10 and about 20 mils. The resin may be spread on the surface using a suitable doctor blade, spatula, paint roller, knife, trowel, brush or the like.

There are many epoxides available on the market from several different suppliers. The epoxides that are preferred in the present invention are those that are two component room temperature curing epoxides that feature high shear and peel strength, and that remain flexible when fully cured. The cured resin should possess these properties over a wide temperature range while at the same time providing resistance to impact, thermal shock, vibration and stress fatigue cracking. Epoxy resin systems are known for their resistance to moisture, creep and corrosion when exposed to a wide range of chemicals, and their resistance to water, fuel, oils and many organic solvents even upon prolonged exposure. An adhesive resin containing no volatile organic solvents, is preferred from an environmental standpoint. A particularly effective epoxy resin for use in the present invention is a product sold as Master Bond Polymer Adhesive EP21TDC by Master Bond Inc. of Hackensack, N.J. This resin when polymerized with an amine hardener gives outstanding bonding ability and peel strength with the cleaned metal substrate. The product viscosity may be adjusted as needed to facilitate the method of application.

Step No. 5 involves the application of the grit to the surface of the first resin layer prior to curing. The type of grit to be selected is often dependent upon the end use application for the skid resistant surface. Silicon carbide, fused aluminum oxide and silica are three types of grit that can be used. All have properties which make them suitable for use in providing the abrasive surface. The particles of silicon carbide and aluminum oxide have a high hardness. Silica is readily available and inexpensive. The particles typically are between 16 and 30 grit, preferably about 20 grit in size. Mixture of two or more of these particulate substances may also be used.

The grit is applied to the surface of the uncured resin by any suitable means capable of distributing a relatively uniform layer of grit on to the resin surface. If means are not readily available for measuring the amount and distribution of the grit over the surface, optional step No. 6 consists of removing excess grit, for example by tilting the substrate and gently tapping to allow the excess to fall off.

In step No. 7, a second layer of epoxy resin, approximately 20 to 40 mils in thickness is applied over the first resin layer and particles. Preferably, this second resin is same as that used in the first layer, optionally colored with a compatible yellow or gray pigment.

Following application of the second resin coat, the resin is fully cured (step 8). The second resin coating effectively anchors all of the particles of grit, but is sufficiently thin so as not to totally cover the particles nor diminish the effectiveness of the grit in providing a skid resistant surface. Curing is carried out either at room temperature or at elevated temperatures. At room temperature, Master Bond Adhesive EP21TDC develops 85% of its maximum bond strength within 24 hours. The bond strength increases continuously thereafter for about one week. The cure can be accelerated by heating the coated substrate at elevated temperatures, for example to 150° F. for 2 hours, to 250° F. for 30 minutes or to 300° F. for 10 minutes whereupon about 80% of the maximum bond strength is achieved. The bond continues to gain in strength for an additional three or four days before maximum strength is achieved. Excess grit particles can then be removed by brushing the surface with a stiff brush. In step 9, the surface may be further treated by the application of one or more coats of paint or other protective finish applied to the top of the fully cured resin. Depending on the end use and on the nature of the pigment (if any) contained in the second layer of resin, the coat or coats of paint can be highly visible yellow, a luminescent color, a coating providing protection from ultraviolet degradation of the epoxy resin, a coating providing a high durability surface for ease of cleaning or for added chemical resistance, or wear, etc. A preferred coating is a siloxane-modified epoxy coating sold by Ameron, Inc. of Brea, C.A. as PSX700. This coating exhibits excellent resistance to moisture, salt spray, acids, corrosives and organic solvents. Another coating that is compatible with the epoxy resin system used in this invention is a polysilicone enamel P—1—8172 marketed by Keeler and Long. This coating contains no solvents or other ingredients that are environmentally harmful.

In step No. 10, an optional second protective or colored coating may be applied and in step No. 11, the adhesive backing, if any, may be peeled from the substrate to produce a final product 12.

Figure 2:
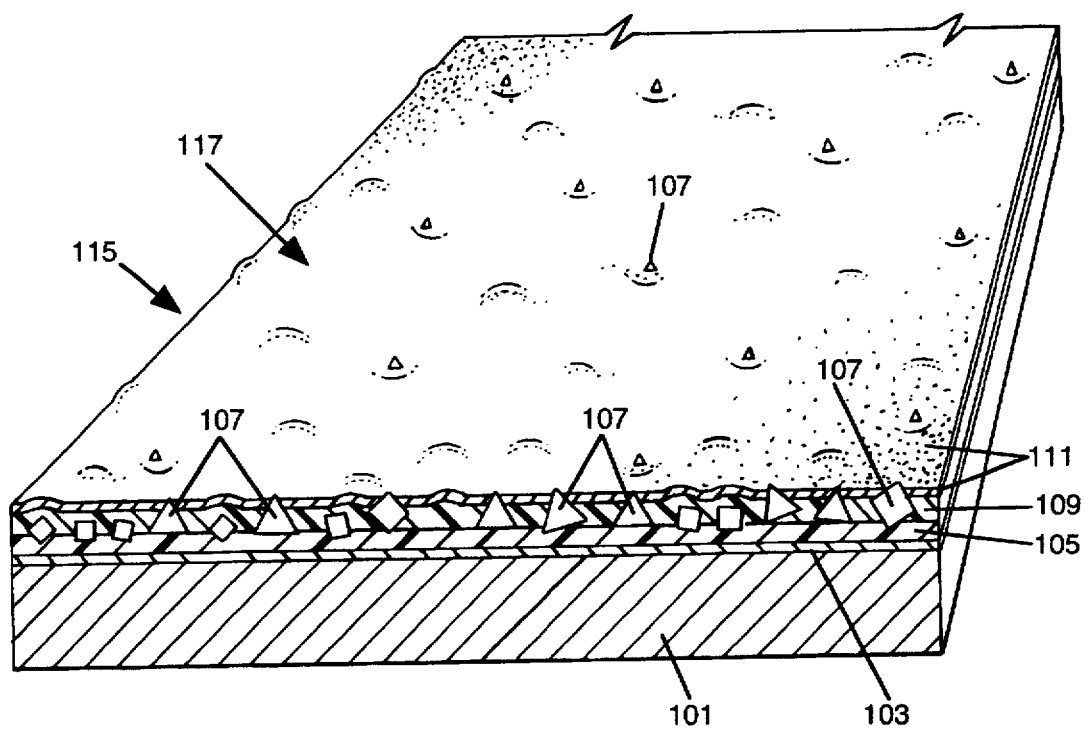
FIG. 2 is an enlarged perspective cross—sectional view of an article prepared by the sequence of steps shown in FIG. 1.

Turning now to FIG. 2, a cross—sectional perspective view of the product 115 of this invention is shown. As previously mentioned, the base metal substrate 101 preferably is composed of a corrosion resistant metal such as type 304 stainless steel or galvanized steel. A satisfactory thickness for the metal is between 16 gauge and 24 gauge, preferably 20 gauge (36–38 mils). Primer layer 103 covers the substrate 101. Overlying the primed metal substrate is a first layer 105 of an epoxy resin having a thickness of between about 10 and about 20 mils. Embedded in the first layer and held firmly in place by a second epoxy layer 109 are grit particles 107. The second resin layer 109 securely anchors the individual grit particles 107 in place. Nevertheless, the relative thinness of the resin layer does not impede the ability of the sharp edges of the grit to provide a highly durable skid resistant surface 117. Although 2 discrete layers of resin are shown in FIG. 2, the interfaces between these layers are likely to be blurred or non—existent after final curing of the resins. The total thickness of the resin in the finished product is between about 30 and about 60 mils. The thicknesses of the first and second resin layers typically are in the approximate ratios of 1:2. The color or protective layer 111 on top of the second layer of resin 109 serves one or more of the functions as previously indicated. The final skid resistant surface 117 is highly resistant to abrasion even under severe operating conditions and wet environments.

The article of the present invention is designed to improve safety by preventing slipping on landings, walkways, catwalks, work stations, platforms, ramps, etc. The ferrometallic substrate typically is preshaped to conform to the intended end—use prior to the application of the skid resistant surface. For example, when used on stairs, the substrate is generally planar with one edge bent at 90 degrees to form a lip to cover the leading edge of the stair tread. For use on ladders, the metal substrate typically is formed into a semicircle or a square channel (depending on the shape of the ladder rungs) to be affixed to each of the rungs. Flat panels are useful for ramps, loading docks, catwalks and the like.

The preparation of the skid resistant substrate has been described in terms of applying the epoxy resin as two discrete layers with the grit applied in an intermediate step. However, this procedure can be carried out in other ways as well, for example, by mixing the particles into the epoxy resin and applying the mix to the primed substrate in one step followed by curing of the resin.

The particles of grit are incorporated into the epoxy layer in an amount which is determined empirically, considering such factors as the size and density of the particles, the severity of use, and the type and shape of the surface to be protected. Typically, when using fused alumina grit, a weight ratio of alumina to resin between about 2.5/1 and 3/1 has been found to be satisfactory. With particles of SiC, or $SiO_2$ having a lower specific gravity, the weight ratio of the particles to the resin is correspondingly less.

The present invention describes a laminated product having extremely good bonding even when constantly exposed to wet conditions. To demonstrate the resistance of the product to delamination, samples prepared according to the teachings of the present invention were submerged in water which was maintained at an elevated temperature in the range of 130°–140° F. for 3000 hours. The samples were then removed from the water and were dried. Efforts to pry the resin layer away from the substrate using a putty knife were unsuccessful. Similar samples prepared without the primer layer showed signs of delamination within about 300 hours.

Having thus described the invention it is claimed:

1. The process of applying a skid resistant surface to a substrate selected from the group consisting of stainless steel and surface treated steel, the process comprising the steps sequentially of:
   a. Cleaning the surface of the substrate to remove contaminants therefrom;
   b. Applying a layer of a primer to the cleaned surface said primer comprising a polychloroprene rubber, and drying the primer to form a dry primed surface;
   c. Applying an uncured epoxy resin containing particles of grit therein on top of the dried primed surface to a total thickness of between about 30 and about 60 mils; and
   d. Curing the epoxy resin.

2. The process according to claim 1 wherein the surface treated steel is galvanized steel.

3. The process according to claim 1 wherein the uncured epoxy resin is applied to the primed surface as a first layer having a thickness of between about 10 and about 20 mils and a second layer having a thickness of between about 20 and about 40 mils.

4. The process according to claim 3 wherein the particles of grit are applied to the first layer of the uncured epoxy resin prior to applying the second layer of epoxy resin.

5. The process according to claim 4 wherein the particles of grit are selected from the group consisting essentially—of fused aluminum oxide particles, silicon carbide particles, silica particles and mixtures thereof.

6. The process according to claim 5 wherein the size of the particles is between about 16 grit and about 30 grit.

7. The process according to claim 1 wherein the polychloroprene rubber is dissolved in an organic solvent comprising a mixture of petroleum distillate, acetone, methyl ethyl ketone and toluene.

8. An article of manufacture having a skid resistant surface particularly useful in wet environments, said article prepared according to the process of claim 1.

9. The article of manufacture according to claim 8 wherein the bond at the interface between the substrate and the cured epoxy resin is unaffected after immersion in water at a temperature of between 130° and 140° F. for a continuous period of time of at least 1000 hours.

10. A process of manufacturing an article having a skid resistant surface on top of a ferrometallic substrate, comprising the steps of:
    a. Cleaning the surface of the substrate to remove contaminants therefrom to form a cleaned surface;
    b. Applying a primer layer of polychloroprene rubber to the cleaned surface, and drying the primer;
    c. Applying a layer of an uncured epoxide resin on top of the dried primer to a thickness of between about 10 mils and about 20 mils;
    d. Applying a layer of grit particles selected from a group consisting of fused aluminum oxide, silicon carbide, silica and mixtures thereof to the surface of the uncured resin layer;
    e. Applying a second layer of uncured epoxide resin on to the first layer and the grit particles to a thickness of about 20 and about 40 mils; and
    f. Curing the epoxide layers.

11. The process according to claim 10 wherein the substrate comprises stainless steel having a thickness of between about 16 gauge and about 24 gauge.

12. An article of manufacture comprising a substrate having a thickness of between about 16 gauge and about 24 gauge and selected from the group consisting of stainless steel and a galvanized steel, and an abrasive layer overlying a surface of said substrate and bonded thereto, a primer layer intermediate the substrate and the abrasive layer consisting esentially of a polychloroprene elastomer deposited on said substrate, said abrasive layer comprising a cured layer of an epoxy resin containing particles of grit selected from the group consisting of fused aluminum oxide, silicon carbide, silica and mixtures thereof in a particle size range of between about 16 and about 30 grit, said article capable of resisting delamination of the epoxy layer from the substrate after 350 hours immersion in water at a sustained elevated temperature between 130° and 140° F.

13. The article according to claim 12 wherein the thickness of the epoxy layer is between about 30 and about 60 mils.

14. The article according to claim 13 wherein the size range of the particles is about 20 grit.

* * * * *